(12) United States Patent
Belet

(10) Patent No.: US 12,493,060 B2
(45) Date of Patent: Dec. 9, 2025

(54) DEVICE FOR POWER SUPPLYING A LOAD AND MEASURING THE CURRENT CONSUMPTION OF THE LOAD

(71) Applicant: STMicroelectronics (Grand Ouest) SAS, Le Mans (FR)

(72) Inventor: Christophe Belet, Parigne l'eveque (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 315 days.

(21) Appl. No.: 18/121,695

(22) Filed: Mar. 15, 2023

(65) Prior Publication Data

US 2023/0296651 A1    Sep. 21, 2023

(30) Foreign Application Priority Data

Mar. 21, 2022  (FR) ...................................... 2202448

(51) Int. Cl.
| | |
|---|---|
| *G01R 19/00* | (2006.01) |
| *G01R 19/25* | (2006.01) |
| *H03F 3/21* | (2006.01) |

(52) U.S. Cl.
CPC ..... *G01R 19/0023* (2013.01); *G01R 19/2509* (2013.01); *H03F 3/211* (2013.01)

(58) Field of Classification Search
CPC ............ G01R 19/0023; G01R 19/2509; G01R 19/0092; G01R 19/0053; G01R 1/203; G01R 1/30; G01R 15/09; H03F 3/211
See application file for complete search history.

(56) References Cited

U.S. PATENT DOCUMENTS

| | | | |
|---|---|---|---|
| 6,255,842 B1 * | 7/2001 | Hashimoto ........ | G01R 31/3004 324/762.02 |
| 2011/0095818 A1 | 4/2011 | Sullivan | |
| 2018/0080960 A1 | 3/2018 | Almosnino | |

FOREIGN PATENT DOCUMENTS

FR    3056299 A1    3/2018

OTHER PUBLICATIONS

INPI Search Report and Written Opinion for priority application, FR 2202448, report dated Jan. 31, 2023, 11 pgs.

* cited by examiner

*Primary Examiner* — Gary L Laxton
*Assistant Examiner* — Jennifer C Caulk
(74) *Attorney, Agent, or Firm* — Crowe & Dunlevy LLC

(57) ABSTRACT

Load current consumption measured using a first resistor having a high resistive value and a second resistor having a low resistive value. Differential amplifiers, the outputs of which are coupled to analog-to-digital converters and to a processing circuit unit, are connected to each of the nodes of the resistors. Depending on the current level, the processing circuit unit advantageously selects one of the analog-to-digital converters to estimate the present consumption of current in the load. Each input terminal of a resistor is advantageously power supplied from a power amplifier and each power amplifier is advantageously driven by a control loop. For low load currents, the first amplifier associated with the first resistor power supplies the load through the resistors while, for high load currents, when this first amplifier saturates, the second amplifier associated with the second resistor, takes over from the first amplifier to continue to power supply the load.

17 Claims, 5 Drawing Sheets

DEVICE FOR POWER SUPPLYING A LOAD AND MEASURING THE CURRENT CONSUMPTION OF THE LOAD

PRIORITY CLAIM

This application claims the priority benefit of French Application for Patent No. 2202448, filed on Mar. 21, 2022, the content of which is hereby incorporated by reference in its entirety to the maximum extent allowable by law.

TECHNICAL FIELD

Embodiments relate to the field of electronics and, in particular, to the measurement of current consumption and more particularly Source and Measure Units (SMU).

BACKGROUND

A Source and Measure Unit (SMU) is a piece of equipment capable of supplying power to an electronic device, or load, and measuring the current consumption of that electronic device (load).

However, some applications require the use of active loads, for example processing circuit units, consuming a current whose value can vary very significantly over a very short period of time.

For example, a processing circuit unit consumes about 100 nanoamperes in a low power mode and then, suddenly, it can consume a current of several hundred milliamperes for a few milliseconds with a current rise or drop in a few microseconds.

It is therefore desirable to be able to measure a current having a wide dynamic range, at a high frequency (wide bandwidth) so as not to lose the measurement of very brief events such as current consumption peaks.

Currently, it is not possible to perform such measurements without changing the operating range of the unit SMU. That is to say, without changing the shunt resistor used to measure the current consumption.

There is consequently a need to improve the dynamic range of current measurement (for very low currents, of the order of the nanoampere, up to high currents, of the order of the Ampere) by one unit SMU without having to modify the value of the resistive shunt network and without impacting the current measurement acquisition bandwidth.

There is also a need to improve the signal-to-noise ratio when measuring very low currents.

SUMMARY

According to particular embodiments, provision is made of a device or unit (such as a Source and Measure Unit (SMU)) for power supplying and measuring the current consumption of a load, using shunt resistors in series to measure the current consumption of the load with a first resistor having a high resistive value and a second resistor having a low resistive value.

Advantageously, provision is also made of differential amplifiers the outputs of which are coupled to analog-to-digital converters and to a processing circuit unit, for example a microcontroller, connected to each of the nodes of the resistors. And, depending on the current level, the processing circuit unit advantageously selects one of the analog-to-digital converters to estimate the present consumption of current in the load.

Each input terminal of a shunt resistor is advantageously power supplied from a power amplifier and each power amplifier is advantageously driven by a control loop to compensate for the voltage drop at the terminals of the shunt resistors and to maintain steady state output voltage and to limit voltage drop during rapid load current transitions.

Thus, according to one implementation, for low load currents, the first amplifier associated with the first resistor power supplies the load through the shunt resistors while, for high load currents, when this first amplifier saturates, the second amplifier associated with the second shunt resistor, takes over from the first amplifier to continue to power supply the load.

According to one aspect of a first variant, provision is made of a device for power supplying and measuring the current consumption of a load, comprising a device input for receiving an input voltage, a device output intended to be connected to said load, a power supply circuit stage coupled between the device input and the device output and a stage for measuring said load current connected to the power supply circuit stage.

According to this aspect, the power supply circuit stage comprises at least a first resistor and a second resistor, connected in series between the device input and the device output.

Alternatively, more than two resistors connected in series could be provided.

The first resistor has a higher value than the second resistor.

These resistors are also called shunt resistors.

The power supply circuit stage also comprises a first power amplifier coupled between the device input and an input terminal of the first resistor, and a second power amplifier controllably coupled between the device input and the input terminal of the second resistor.

The measurement circuit stage is connected to the terminals of said resistors.

The device according to this aspect further includes a detection circuit configured to detect a saturation condition of the first power amplifier.

The power supply circuit stage then further includes a control circuit configured to couple the second amplifier to the device input in the presence of said saturation condition.

Advantageously, the first power amplifier and the second power amplifier have a frequency bandwidth greater by one frequency decade within a tolerance, for example within 10%, than that of the measurement circuit stage.

This allows a good rejection of the measurement noise of the measurement circuit stage.

Furthermore, these power amplifiers are preferably low noise amplifiers, allowing load current measurements with low background noise.

According to one embodiment, the power supply circuit stage comprises: a first regulation loop coupled between an output terminal of the second resistor and an input terminal of the first resistor and including a first adder/subtractor coupled to the device input and also including the first power amplifier coupled between the first adder/subtractor and the input terminal of the first resistor.

The power supply circuit stage also comprises: a second regulation loop coupled between an output terminal of the second resistor and an input terminal of the second resistor and including a second adder/subtractor as well as the second power amplifier coupled between the second adder/subtractor and the input terminal of the second resistor.

The control circuit includes, for example, a switch coupled between the second adder/subtractor and the device input, and the detection circuit is configured to control said switch.

According to one embodiment, the measurement circuit stage comprises a first differential amplifier circuit module coupled at the input to the input terminal and to the output terminal of the first resistor and coupled at the input to the input terminal and to the output terminal of the second resistor.

Moreover, the detection circuit includes, for example, a comparator having a first input coupled to the second amplifier module and a second input configured to receive a saturation voltage representative of said saturation condition.

The comparator is then configured to deliver a control signal representative of the presence or absence of said saturation condition (depending on the result of the comparison), this control signal being configured to control said control circuit.

According to one embodiment, the measurement circuit stage further comprises: a first analog-to-digital conversion module coupled to the output of the first differential amplifier circuit module; a second analog-to-digital conversion module coupled to the output of the second differential amplifier module; and a processing circuit unit, for example a microcontroller, coupled to the output of the two analog-to-digital conversion modules and configured to determine the present value of the current consumed by the load.

According to one embodiment, the first differential amplifier circuit module includes a first operational amplifier coupled to the input terminal of the first resistor and a second operational amplifier coupled to the output terminal of the first resistor.

The gain of the first operational amplifier is greater than the gain of the second operational amplifier.

The second differential amplifier module includes, for example, a third operational amplifier coupled to the input terminal of the second resistor and a fourth operational amplifier coupled to the output terminal of the second resistor.

The gain of the third operational amplifier is greater than the gain of the fourth operational amplifier.

According to one embodiment, the first analog-to-digital conversion module includes a first analog-to-digital converter coupled to the output of the first operational amplifier and a second analog-to-digital converter coupled to the output of the second operational amplifier.

The second analog-to-digital conversion module includes, for example, a third analog-to-digital converter coupled to the output of the third operational amplifier and a fourth analog-to-digital converter coupled to the output of the fourth operational amplifier.

The processing circuit unit is then advantageously configured to examine the outputs of the four analog-to-digital converters, for example simultaneously, and to select the one which provides the most significant value, this value being representative of the present value of the current consumed by said load.

The device is advantageously produced in integrated form.

According to another aspect of this first variant, provision is made of a method for power supplying and measuring the current consumption of a load, comprising: connecting in series a first power amplifier and at least a first resistor and a second resistor between a device input and said load, the first resistor, connected to the device input, having a resistive value greater than that of the second resistor, connected to the load; applying a reference voltage to the device input; and when the first amplifier saturates, power supplying the load with the reference voltage through a second power amplifier and the second resistor, and measuring the current consumed at the terminals of the second resistor; and as long as the first power amplifier does not saturate, not activating the second power amplifier and power supplying the load with the reference voltage through the first power amplifier and said at least one first and second resistors, and measuring the current consumed at the terminals of the first resistor.

According to one implementation, the method comprises: as long as the first power amplifier does not saturate, regulating at the reference voltage, the voltage present at the terminals of the load, using a first regulation loop incorporating the first power amplifier and said resistors and having the reference voltage as the setpoint voltage; and when the first amplifier saturates, regulating at the reference voltage, the voltage present at the terminals of the load, using a second regulation loop incorporating the second power amplifier and the second resistor and having the reference voltage as the setpoint voltage.

According to one aspect of a second variant, simpler to produce and in particular which does not require the detection circuit and the control circuit operations noted above, provision is made of a device for power supplying and measuring the current consumption of a load, comprising: a device input configured to receive an input voltage; a device output configured to be connected to said load; a power supply circuit stage coupled between the device input and the device output; and a stage for measuring said load current connected to the power supply circuit stage.

The power supply circuit stage comprises: at least a first resistor and a second resistor connected in series between the device input and the device output, the first resistor having a resistive value greater than that of the second resistor; an auxiliary node configured to receive an auxiliary voltage lower than the reference voltage; a first power amplifier coupled between the device input and an input terminal of the first resistor; and a second power amplifier coupled between the device input and the auxiliary node; and wherein the measurement circuit stage is connected to the terminals of said resistors.

According to one embodiment, the auxiliary voltage is equal to the reference voltage minus an offset voltage.

In this second variant, the power supply circuit stage also comprises the first regulation loop and the second regulation loop mentioned above and including, in particular, a first adder/subtractor and a second adder/subtractor.

Said reference voltage is applied to the input of the first adder/subtractor, while said auxiliary voltage is applied to the input of the second adder/subtractor.

The offset voltage is advantageously on the one hand as low as possible to minimize the regulation error between the reference voltage (setpoint voltage) and the regulated voltage (voltage at the terminals of the load) and on the other hand sufficient to allow to detect the saturation of the first loop resulting in a voltage drop equal to or greater than said offset voltage.

For example, the offset voltage could be set between 1 mV and 50 mV.

In this second variant, the structure of the measurement circuit stage is similar to that of the measurement circuit stage of the first variant, with the difference that the measurement circuit stage of the second variant does not include the detection circuit of the saturation condition of the first power amplifier.

Indeed, in this second variant, the detection of the saturation condition is not carried out at the measurement circuit stage as in the first variant, but at the power supply circuit stage thanks advantageously to the offset voltage.

More specifically, the first loop regulates the output voltage (at the terminals of the load) to the setpoint voltage. The second loop does not regulate because its setpoint voltage (auxiliary voltage) is lower than the setpoint voltage (the auxiliary voltage is equal to the setpoint voltage increased by the offset voltage).

When the load increases to the saturation level of the amplifier of the first loop, the amplifier can no longer regulate (it becomes saturated). This results in a voltage drop at the terminals of the load. When this voltage drop at the terminals of the load becomes equal to or greater than the offset voltage, that is to say when the output voltage becomes equal to or less than the auxiliary voltage, the second loop begins to regulate the output voltage to the auxiliary voltage value.

This is the principle of detection of the saturation condition in this second variant.

According to another aspect of this second variant, provision is made of a method for power supplying and measuring the current consumption of a load, comprising: connecting in series a first power amplifier and at least a first resistor and a second resistor between a device input and said load, the first resistor, connected to the device input, having a resistive value greater than that of the second resistor, connected to the load; applying a reference voltage to the device input; and when the first amplifier saturates, power supplying the load with an auxiliary voltage lower than the reference voltage through a second power amplifier and the second resistor, and measuring the current consumed at the terminals of the second resistor, and as long as the first power amplifier does not saturate, not activating the second power amplifier and power supplying the load with the reference voltage through the first power amplifier and said at least one first and second resistors and measuring the current consumed at the terminals of the first resistor.

According to one embodiment, the auxiliary voltage is equal to the reference voltage minus an offset voltage.

According to one implementation, the method comprises: as long as the first power amplifier does not saturate, regulating at the reference voltage, the voltage present at the terminals of the load, using a first regulation loop incorporating the first power amplifier and said resistors and having the reference voltage as the setpoint voltage; and if the first amplifier saturates, regulating at the auxiliary voltage, the voltage present at the terminals of the load, using a second regulation loop incorporating the second power amplifier and the second resistor and having the auxiliary voltage as the setpoint voltage.

BRIEF DESCRIPTION OF THE DRAWINGS

Other advantages and features of the invention will appear upon examining the detailed description of non-limiting embodiments and implementations and of the appended drawings wherein.

DETAILED DESCRIPTION

Figure 1:
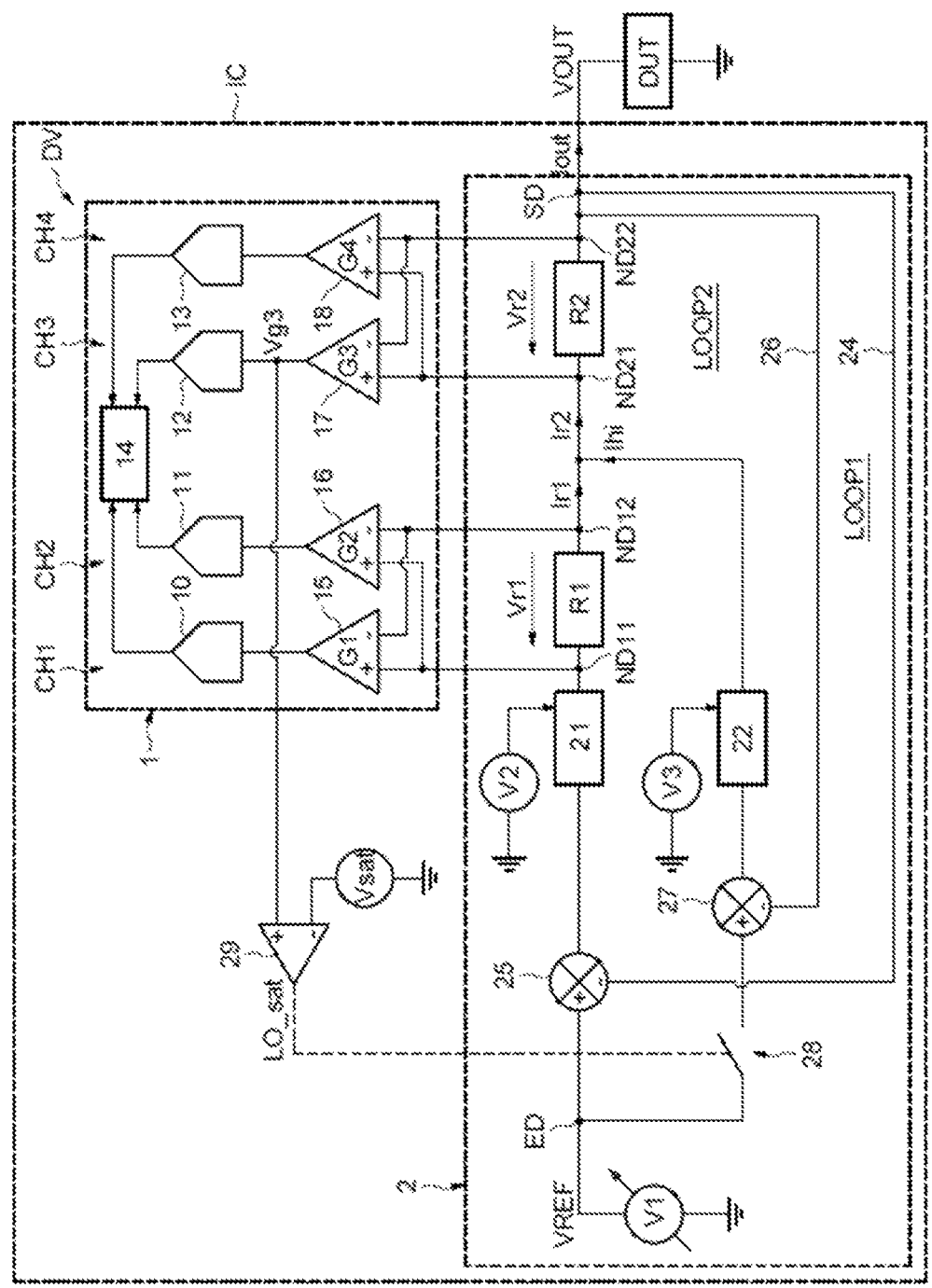
FIG. 1 is a block diagram of an integrated circuit device for power supplying and measuring the present consumption of a load.

In FIG. 1, the reference DV denotes a device for power supplying and measuring the present consumption of a load DUT according to a first variant (embodiment). This device is also referred to as a Source and Measure Unit (SMU).

It is, for example, produced within an integrated circuit IC.

The load (device under test—DUT) can be a passive load or here an active load, for example a processing circuit unit such as a microcontroller or a microprocessor.

The device DV includes a device input ED for receiving an input voltage VREF from a voltage source V1.

By way of example, the voltage VREF can be equal to 3 volts.

The voltage source V1 can be incorporated within the device DV or else be a voltage source external to this device DV.

The device DV includes a power supply circuit stage 2 coupled between the device input ED and the device output SD which is connected to the load DUT.

The device DV also includes a measurement circuit stage 1 for measuring the load current, this measurement circuit stage 1 being connected to the power supply circuit stage 2.

The power supply circuit stage 2 comprises a first resistor R1 and a second resistor R2 connected in series between the device input ED and the device output SD. These two resistors are also called shunt resistors.

The resistive value of the first resistor R1 is greater than the resistive value of the second resistor R2. For example, the resistor R1 has a relatively higher resistive value (for example, 3.3 kilo-ohms) while the resistor R2 has a relatively lower resistive value (for example, 0.5 ohms).

The power supply circuit stage 2 also includes a first power amplifier 21, for example a low noise power amplifier, power supplied by a voltage source V2, and connected between the input terminal ND11 of the first resistor R1 and a first adder/subtractor 25 itself connected via its + (positive) input to the device input ED.

The power supply circuit stage 2 also includes a second power amplifier 22, advantageously a low noise power amplifier, power supplied by a voltage source V3 and connected between the input terminal ND21 of the second resistor R2 (which is also the output terminal ND12 of the first resistor R1) and the device input ED via a second adder/subtractor 27 whose + (positive) input is connected to the device input ED via a controllable switch 28, for example a MOS transistor.

The − (negative) input of the first adder/subtractor 25 is connected to the output terminal ND22 of the second resistor R2 and therefore here to the device output SD.

The same is true for the − (negative) input of the second adder/subtractor 27.

Therefore, the feedback connection 24, the first adder/subtractor 25 and the first amplifier 21 form a first regulation loop LOOP1.

The feedback connection 26, the second adder/subtractor 27 and the second amplifier 22 form a second regulation loop LOOP2.

The measurement circuit stage 1 comprises a first differential amplifier circuit module including two operational amplifiers 15 and 16 connected to the input terminal ND11 and the output terminal ND12 of the first resistor R1.

More specifically, the + input of the first operational amplifier 15 is connected on the one hand to the + input of the second operational amplifier 16 and to the input terminal ND11 of the first resistor R1 while the − input of the first amplifier 15 is connected on the one hand to the − input of the second operational amplifier 16 and to the output terminal ND12 of the first resistor R1.

The measurement circuit stage 1 also includes a second differential amplifier circuit module including a third operational amplifier 17 and a fourth operational amplifier 18.

This second differential amplifier circuit module is connected to the two terminals of the second resistor R2.

More specifically, the + input of the third operational amplifier 17 is connected on the one hand to the + input of the fourth operational amplifier 18 and to the input terminal ND21 of the second resistor R2, while the − input of the third operational amplifier 17 is connected on the one hand to the − input of the fourth operational amplifier 18 and to the output terminal ND22 of the second resistor R2.

The gain G1 of the first operational amplifier 15 is greater than the gain G2 of the second operational amplifier 16.

Similarly, the gain G3 of the third operational amplifier 17 is greater than the gain G4 of the fourth operational amplifier 18.

The measurement circuit stage 1 also includes a first analog-to-digital conversion circuit module coupled to the outputs of the first and second operational amplifiers 15, 16.

This first analog-to-digital conversion module includes a first analog-to-digital converter 10 coupled to the output of the first operational amplifier 15 and a second analog-to-digital converter 11 coupled to the output of the second operational amplifier 16.

The measurement circuit stage 1 also includes a second analog-to-digital conversion module coupled to the output of the third and fourth operational amplifiers 17, 18.

More specifically, this second analog-to-digital conversion module here includes a third analog-to-digital converter 12 coupled to the output of the third operational amplifier 17 and a fourth analog-to-digital converter 13 coupled to the output of the fourth operational amplifier 18.

The outputs of the four analog-to-digital converters 10, 11, 12 and 13 are connected to a processing circuit unit 14, for example a microcontroller, which is configured to determine, as will be seen in more detail below, the present value of the current consumed by the load DUT.

The device DV also includes a detection circuit 29 configured to detect a saturation condition of the first power amplifier 21.

The detection circuit is represented here outside the measurement circuit stage 1 but it could also be incorporated into this measurement circuit stage.

More specifically, the detection circuit here includes a comparator 29 having a first + input coupled to the second differential amplifier module, and more specifically to the output of the third operational amplifier 17.

The comparator 29 also has a second − input to receive a saturation voltage Vsat representative of the saturation condition, that is to say representative here of the saturation of the first power amplifier 21.

The output of the comparator 29 delivers a logic control signal LO_sat configured to control the switch 28.

The device DV thus aims, in particular, at measuring the high-frequency current consumption (about a hundred kilohertz) of the load DUT, for example an active load, which can consume a current having a large dynamic range (extending, for example, from the nanoampere to the ampere).

The two regulation loops LOOP1 and LOOP2 aim at power supplying the load DUT by providing a regulated output voltage VOUT.

The resistors R1 and R2 are used to evaluate the current consumption Iout in the load by measuring the voltages Vr1 and Vr2 at their terminals and using Ohm's law (Ir1=Vr1/R1 and Ir2=Vr2/R2).

The first shunt resistor R1 has a high resistive value to measure low currents Iout consumed by the load DUT and the second shunt resistor R2 has a low resistive value to measure high currents Iout consumed by the load DUT.

When the load DUT consumes low or very low current, the load DUT is power supplied from the first power amplifier 21 through the two resistors R1 and R2.

The output voltage VOUT is then regulated to the input voltage VREF thanks to the first regulation loop LOOP1 and the current Iout is evaluated by measuring the voltage Vr1 at the terminals of the first resistor R1 using the measurement circuit stage 1 and more particularly using the first operational amplifier 15 and the first analog-to-digital converter 10 or else using the second operational amplifier 16 and the second analog-to-digital converter 11.

When the load DUT consumes medium current or high current, the load DUT is power supplied from the second amplifier 22 through the second shunt resistor R2.

The output voltage VOUT is then regulated to the input voltage VREF thanks to the second regulation loop LOOP2 and the current Iout is then evaluated by measuring the voltage Vr2 at the terminals of the second resistor R2 using the measurement circuit stage 1 and more particularly using the third operational amplifier 17 and the third analog-to-digital converter 12 or else the fourth operational amplifier 18 and the fourth analog-to-digital converter 13.

The comparator 29 and the switch 28 controlled by the logic control signal LO_sat delivered by the comparator 29 allow very quickly to activate or deactivate the second amplifier 22 respectively when the load DUT consumes a current Iout greater or less than a predefined value which is evaluated in operation from the voltage Vr2 at the terminals of the second resistor R2, and the voltage Vg3 at the output of the third operational amplifier 17.

The operation of the power supply circuit stage 2 will now be described in more detail.

As indicated above, the load DUT is power supplied by the constant voltage VOUT delivered by the first amplifier 21 or the second amplifier 22 respectively when the load DUT consumes a low or a high current Iout.

The power amplifiers 21 and 22 are preferably low noise amplifiers allowing measurements of the current consumption through the resistors R1 and R2 with low background noise.

Moreover, these power amplifiers 21 and 22 have a frequency bandwidth greater than that of the measurement circuit stage 1, in an order of magnitude of a decade of frequencies, thus allowing good rejection of the noise generated by the measurement circuit stage 1.

The power amplifiers 21 and 22 are power supplied respectively by the voltage sources V2 and V3 which can take, for example, the same value equal to 5.2 volts.

The amplifiers 21 and 22 saturate either when their respective output voltages are close to their respective power supply voltages (for example, each amplifier has a voltage drop ("drop out") of 200 millivolts, which means that they reach the saturation at 5 volts (5.2-0.2) or when providing a certain amount of current (for example, the amplifier 21 can saturate at 600 microamperes while the amplifier 22 can saturate at 1 amp).

The first resistor R1 has a high resistive value (3.3 kiloohms, for example) and is dedicated to measuring the current consumed by the load DUT when the latter operates at low load.

The first amplifier 21 delivers the voltage VOUT through the two resistors R1 and R2. Additionally, the second amplifier 22 is deactivated when the output current Iout is low. In this case, the output current Iout is equal to the current Ir1 and to the current Ir2 because the current Ihi is zero.

The measurement circuit stage 1 then performs measurements of the voltage Vr1 with high dynamic resolution and with high bandwidth and sampling rate.

The first loop LOOP1 compensates for the voltage drop at the terminals of the resistors R1 and R2 to keep the output voltage VOUT equal to the input voltage VREF.

The second resistor R2 has a low resistive value, for example 0.5 ohms. It is dedicated to measuring the current consumed in the load DUT when the latter is operating under heavy load. In such a high load regime, for example when the current Iout is greater than 600 microamperes, the first amplifier 21 saturates and the second amplifier 22 is then activated (switch 28 is closed).

The second amplifier 22 then delivers the voltage VOUT through the second resistor R2. The measurement circuit stage then performs measurements of the voltage Vr2 also with high and dynamic resolution and with high bandwidth and sampling rate.

It is at this time the second loop LOOP2 which compensates for the voltage drop at the terminals of the resistor R2 will maintain the output voltage VOUT equal to the input voltage VREF.

As indicated above, the second amplifier 22 is activated or deactivated in operation thanks to the switch 28 which is closed or open depending on the current Iout consumed by the load DUT.

The switch 28 is controlled by the logic control signal LO_sat which, when it has for example the logic value 1, leads to a closing of the switch 28 and when it has a logic value 0 leads to an opening of the switch 28.

Figure 2:
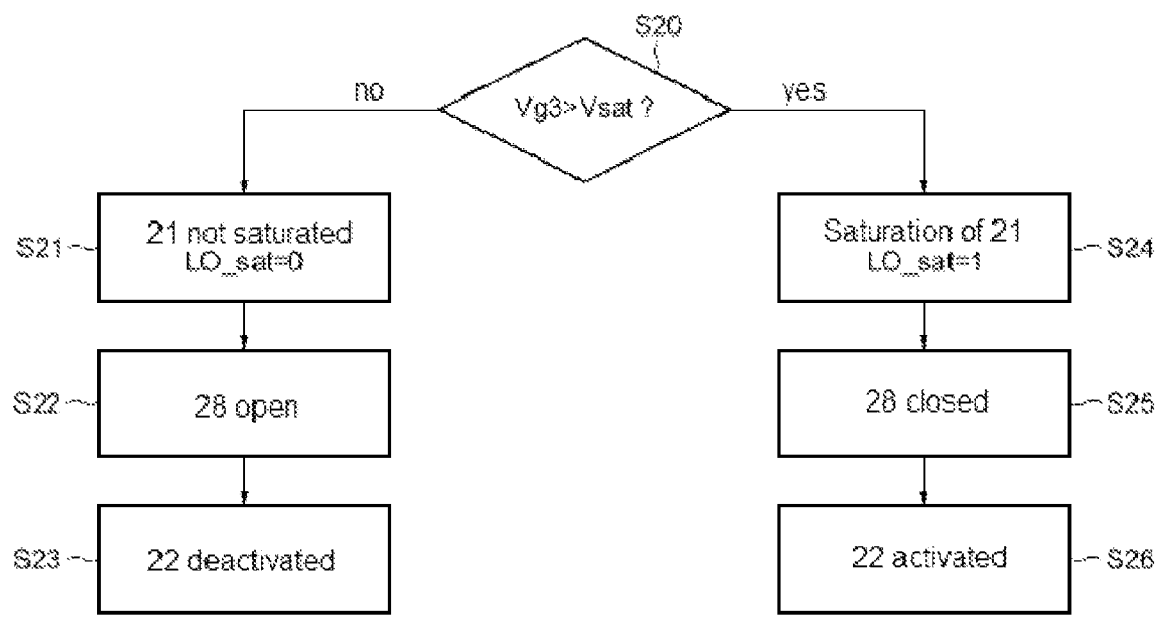
FIG. 2 is a flow diagram for operation of the circuit of FIG. 1.

As schematically illustrated in FIG. 2, the value of the logic control signal LO_sat depends on the comparison S20 performed by the comparator 29 between the voltage Vg3 and the saturation voltage Vsat.

Vg3 is an image of the current IOUT and Vsat is representative of said saturation condition and is a constant voltage threshold equivalent to the saturation threshold of the first amplifier 21, for example 600 microamperes.

Thus, if in step S20, the voltage Vg3 is not greater than the voltage Vsat, then the saturation condition is not present, which means that the amplifier 21 is not saturated and the logic signal control LO_sat then takes the logic value 0 (step S21).

This leads in step S22 to an opening of the switch 28 and therefore to a deactivation of the second amplifier 22 (step S23).

If, on the other hand, in step S20, the voltage Vg3 is greater than the voltage Vsat, then the saturation condition is present, which means that the first amplifier 21 saturates and the logic control signal LO_sat then takes the logic value 1 (step S24).

This leads in step S25 to the closing of the switch 28 and therefore to the activation of the second amplifier 22 (step S26).

The operation of the measurement circuit stage 1 will now be described in more detail.

This measurement circuit stage aims at converting the measurements of the voltages Vr1 and Vr2 measured at the terminals of the two resistors R1 and R2 into current values available by the processing circuit unit 14.

After these measurements have been processed by the processing circuit unit, the values delivered by the latter are images of the current Iout consumed by the load DUT and are available to a user.

The processing circuit unit 14 continuously performs voltage measurements at a high sampling rate (the sampling frequency depends on the expected bandwidth and can be taken for example equal to 100 KHertz) using the analog-to-digital converters 10 to 13.

For example, each analog-to-digital converter is a 12-bit converter with an input voltage range of 4.096 volts, which therefore leads to having 1 millivolt per least significant bit (LSB) (4.096 volts correspond to 4096 LSB).

Thus, 1 millivolt is the input sensitivity of the analog-to-digital converter and 4.096 volts is the maximum input voltage that can be converted by the analog-to-digital converter and corresponding to a word of 4096 LSB.

The input of each analog-to-digital converter 10 to 13 is amplified by the corresponding operational amplifier 15 to 18.

The amplifier 15 has a high gain, for example 150, to measure low voltage values at the terminals of the first resistor R1 while the operational amplifier 16 has a low gain, for example 10, to measure low voltage values at the terminals of the first resistor R1. Consequently, the operational amplifier 15 allows the measurement of very low currents, (for example within a range extending from 2 nanoamperes to 8.3 microamperes) while the operational amplifier 16 measures low currents, for example within a range extending from 30 nanoamperes to 124 microamperes.

The operational amplifier 17 has a high gain, for example 100, to measure very low voltage values at the terminals of the second resistor R2 while the operational amplifier 18 has a low gain, for example 10, to measure low voltage values at the terminals of the second resistor R2.

Consequently, the amplifier 17 allows the measurement of currents having an average value, for example within a range from 20 microamperes to 82 milliamperes, while the operational amplifier 18 measures high currents, for example within a range from 400 microamperes to 1.6 amps.

It is therefore possible to define in the measurement circuit stage 1:
- a first path including the first operational amplifier 15 followed by the first analog-to-digital converter 10;
- a second path including the second operational amplifier 16 followed by the second analog-to-digital converter 11;
- a third path including the third operational amplifier 17 followed by the third analog-to-digital converter 12; and
- a fourth path including the fourth operational amplifier 18 followed by the fourth analog-to-digital converter 13.

These four paths are respectively referenced as channel paths CH1 to CH4 in FIG. 1.

In operation, the processing circuit unit 14 examines each path, for example simultaneously, and selects the one which gives the most precise measurement.

For example, if the load DUT consumes 10 microamperes, the output of the analog-to-digital converter 13 will be 0 LSB, that of the analog-to-digital converter 12 will be 0

LSB, that of the analog-to-digital converter 11 will be 330 LSB, and that of the analog-to-digital converter 10 will be equal at 4095 LSB.

The processing circuit unit will therefore select the data delivered by the analog-to-digital converter 11 because the values 0 LSB are not significant, the value 4095 LSB is not significant because it represents the maximum value of the analog-to-digital converter. The only significant value is the value 330 LSB delivered by the analog-to-digital converter 11.

Moreover, overlaps between the paths CH1 to CH4 allow to maintain good resolution when the processing circuit unit 14 uses current measurements having low values on one path.

Figure 3:
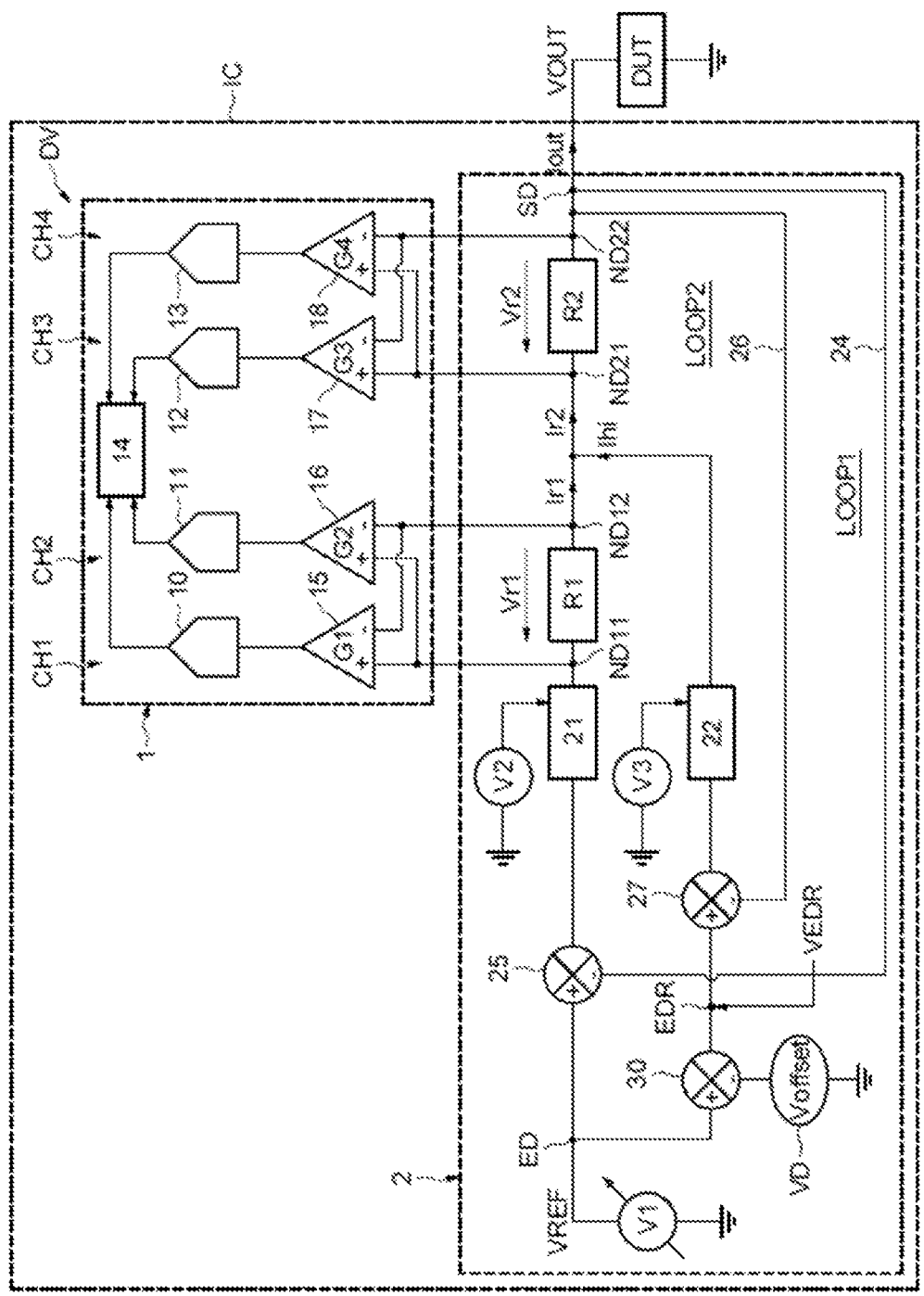
FIG. 3 is a block diagram of an integrated circuit device for power supplying and measuring the present consumption of a load.
Figure 4:
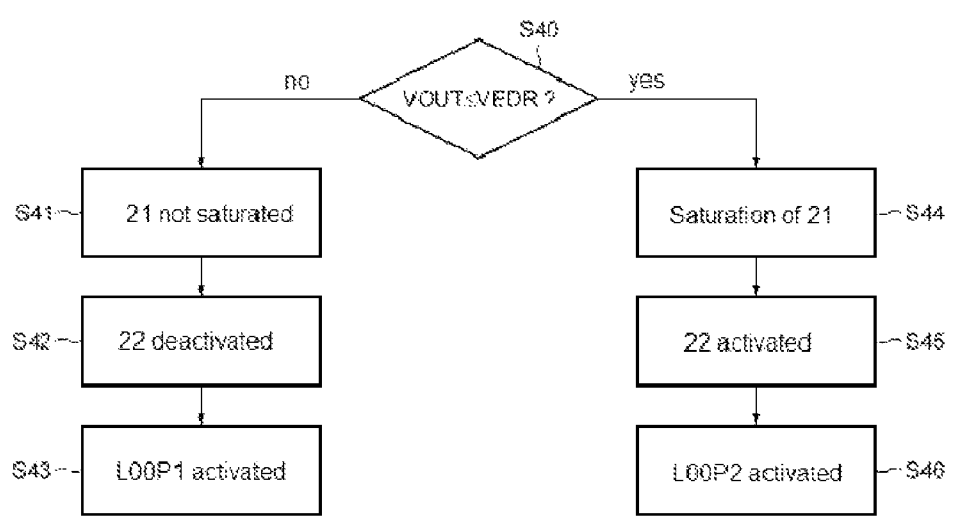
FIG. 4 is a flow diagram for operation of the circuit of FIG. 3.

FIGS. 3 and 4 illustrate a second variant (embodiment).

FIG. 3, elements similar to those of FIG. 1 have identical references to those they have in FIG. 1.

The description and the functionality of these similar elements will not be described again here for the purpose of simplification.

The device DV of FIG. 3 differs from that of FIG. 1 in that it comprises neither the detection circuit 29 using the voltage Vg3 nor the control circuit 28 allowing to activate or deactivate the second power amplifier 22.

The power supply circuit stage 2 here comprises an auxiliary voltage source VD configured to generate an offset voltage Voffset and a third adder/subtractor 30 whose − (negative) input is connected to the auxiliary voltage source VD and whose + (positive) input is connected to the device input ED.

The output of this third adder/subtractor 30 forms an auxiliary node EDR at which the auxiliary voltage VEDR is present, lower than the reference voltage VREF and equal to VREF−Voffset.

The auxiliary node ERD is connected to the + input of the second adder/subtractor 27.

The first adder/subtractor 25 has a first intrinsic offset voltage and the second adder/subtractor 27 has a second intrinsic offset voltage.

The offset voltage Voffset is a constant voltage and of the lowest possible value defined such that the voltage Voffset is greater than the sum of the intrinsic offset voltages of the adders/subtractors 25 and 27 more commonly called "offset error" on operational amplifier integrated circuits and resulting from the design inaccuracies of the adders/subtractors 25 and 27.

The person skilled in the art will be able to choose the value of Voffset according to the features of these adders/subtractors and the application considered. By way of non-limiting example, the offset voltage Voffset may be equal to 3 mV.

In this second variant embodiment, two different voltage setpoints are compared, namely the reference voltage VREF for the regulation loop LOOP1 and the auxiliary voltage VEDR (VEDR=VREF−Voffset) for the regulation loop LOOP2.

These two voltage setpoints are compared with respect to the output voltage VOUT (measured at the output terminal ND22) respectively by the adder/subtractor 25 for the loop LOOP1 and by the adder/subtractor 27 for the loop LOOP2.

When the load DUT consumes low or very low current, the load DUT is power supplied from the first power amplifier 21 through the two resistors R1 and R2.

The output voltage VOUT is regulated to the reference voltage VREF thanks to the first regulation loop LOOP1 which has the setpoint voltage VREF.

Therefore, the output voltage VOUT is equal to VREF. And the current Iout is evaluated by measuring the voltage Vr1 at the terminals of the first resistor R1. In this case, the loop LOOP2 is inactive because the output voltage VOUT is greater than its setpoint voltage VEDR (VOUT is greater than VEDR since VOUT=VREF>VEDR). The amplifier 22 does not regulate and is considered off or not activated.

When the load DUT consumes medium current or high current, the amplifier 21 is saturated and therefore the load DUT is power supplied from the second amplifier 22 through the second shunt resistor R2.

The output voltage VOUT is then regulated to the setpoint voltage VEDR thanks to the second regulation loop LOOP2 and the current Iout is then evaluated by measuring the voltage Vr2 at the terminals of the second resistor R2.

In this case, the loop LOOP1 is no longer capable of regulating the output voltage VOUT to its setpoint voltage VREF because the power amplifier 21 is saturated. Consequently, the voltage VOUT drops until it reaches the setpoint voltage VEDR of the second loop LOOP2. When VOUT reaches the setpoint voltage VEDR, the second loop LOOP2 begins to regulate thanks to the amplifier 22 which becomes implicitly activated.

Therefore, when the load DUT consumes a medium current or a high current (loop LOOP2 activated) the output voltage VOUT is regulated at VREF−Voffset since VEDR=VREF−Voffset and therefore VOUT=VERD=VREF−Voffset.

If, for example, the setpoint voltage VREF is 3V and Voffset is equal to 3 mV, the output voltage will then be regulated at 3V-3 mV, that is to say 2.997V, that is to say an error of 0.3% compared to the expected setpoint value.

An implementation of the method according to this second variant is illustrated in FIG. 4.

If in step S40, the output voltage VOUT is less than or equal to the auxiliary voltage VEDR, there is saturation of the first power amplifier 21 (step S44) and the second power amplifier 22 is activated (step S45). The second regulation loop LOOP2 is active (step S46).

If in step S40, the output voltage VOUT is higher than the auxiliary voltage VEDR, there is no saturation of the first power amplifier 21 (step S41) and the second power amplifier 22 is not activated (step S42). The first regulation loop LOOP1 is active (step S43).

Figure 5:
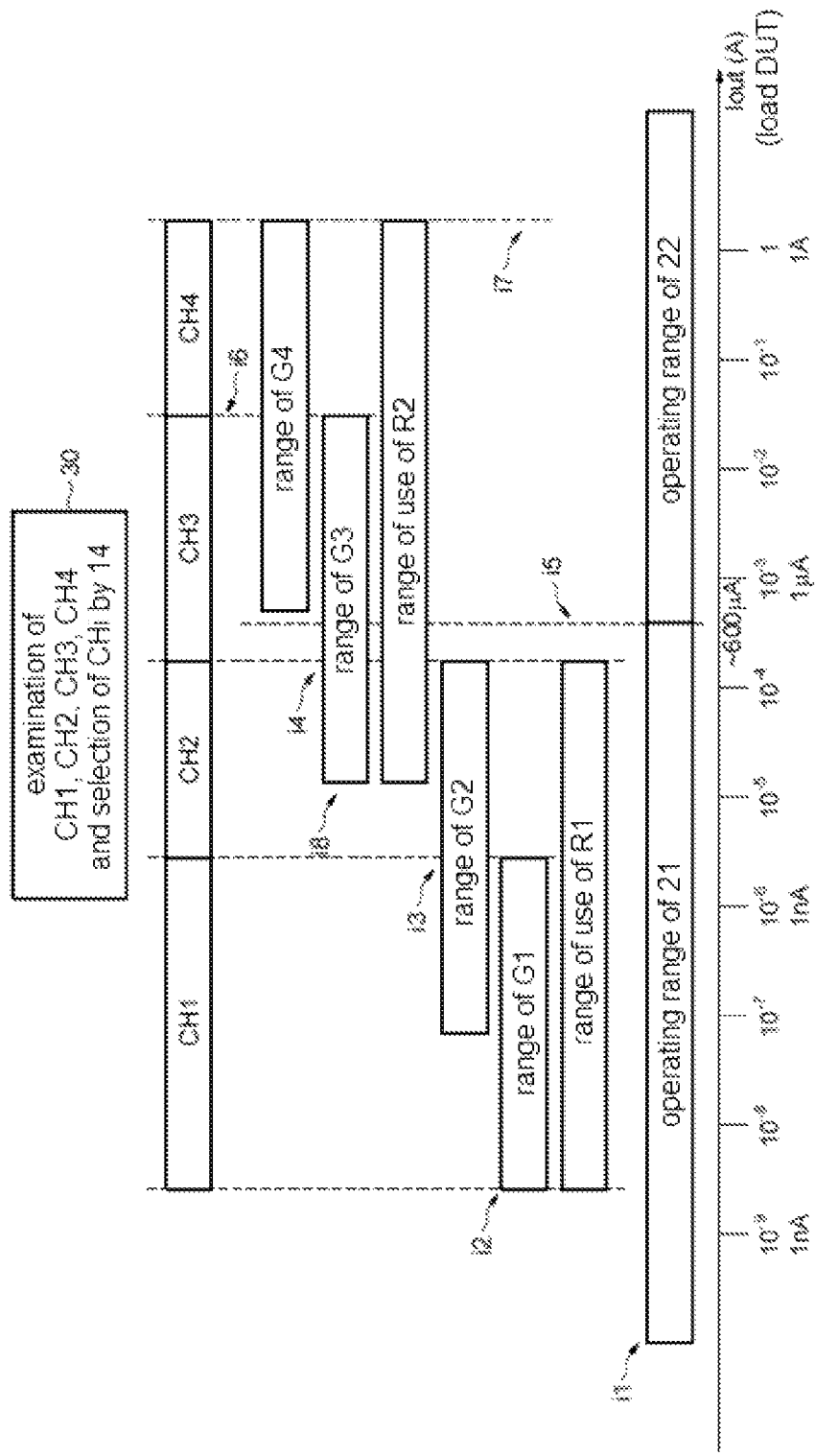
FIG. 5 schematically illustrates a functional behavior of the circuit as a function of the current.

FIG. 5 schematically illustrates in the lower part the functional behavior of circuit stages 1 and 2 as a function of the current.

More specifically, as indicated previously, for a current i1 corresponding to no load (for example Iout less than 1 nanoampere) up to a load current i5 (for example Iout of the order of 600 microamperes), the first amplifier 21 operates to regulate a constant output voltage.

For loads higher than i5 (for example Iout greater than 600 microamperes) the second amplifier 22 takes over to regulate the output voltage on the load DUT.

The first resistor R1 can be used only when the first amplifier 21 is operating. Furthermore, the use of the first resistor R1 is limited by the operating range of the measurement circuit stage 1 (between i2 corresponding to the minimum measurement resolution of the operational amplifier 15 up to i4 corresponding to the resolution of maximum measurement of the operational amplifier 16).

The second resistor R2 can be used for any load condition since the current Ir2 is always equal to the current Iout. However, the use of R2 is here again limited by the operating range of the measurement circuit stage 1 (which extends from i8 corresponding to the minimum measurement resolution of the operational amplifier 17 up to i7 corresponding to the resolution of maximum measurement of the operational amplifier 18).

As indicated previously, the processing circuit unit 14 measures in step S30 (upper part of FIG. 5) the four channel paths CH1-CH4 in parallel and in real time. For each sample acquired from the four channel paths, the processing circuit unit will select a value among the four values of these four samples by comparing the acquisition results.

More specifically, the value from the channel path CH4 is selected if this value is located between the static thresholds i6 and i7.

The value delivered by the channel path CH3 is selected if this value is located between the static thresholds i4 and i6.

The value from channel path CH2 is selected if the value delivered is located between static thresholds i3 and i4.

Finally, the value delivered by the channel path CH1 is selected if this value is located between the static thresholds i2 and i3.

The thresholds i2, i3, i4, i6 and i7 are static thresholds predefined during the design of stages 1 and 2.

The invention claimed is:

1. A device for power supplying and measuring the current consumption of a load, comprising:
   a device input configured to receive a reference voltage;
   a device output configured to be connected to said load;
   a power supply circuit stage coupled between the device input and the device output; and
   a measurement circuit stage connected to the power supply circuit stage and configured to measure a load current;
   wherein the power supply circuit stage comprises:
      a first resistor and a second resistor connected in series between the device input and the device output, the first resistor having a resistive value greater than a resistive value of the second resistor;
      an auxiliary node configured to receive an auxiliary voltage lower than the reference voltage;
      a first power amplifier having an input coupled to the device input and an output coupled to an input terminal of the first resistor; and
      a second power amplifier having an input coupled to the auxiliary node and an output coupled to an input terminal of the second resistor; and
   wherein the measurement circuit stage is connected to input and output terminals of said first and second resistors.

2. The device according to claim 1, wherein the auxiliary voltage is equal to the reference voltage minus an offset voltage.

3. The device according to claim 2, wherein the power supply circuit stage comprises:
   a first adder/subtractor having a first input coupled to the device input, a second input coupled to the output terminal of the second resistor and an output coupled to the input of the first power amplifier to form a first regulation loop between the output terminal of the second resistor and the input terminal of the first resistor; and
   a second adder/subtractor having a first input coupled to the auxiliary node, a second input coupled to the output terminal of the second resistor and an output coupled to the input of the second power amplifier to form a second regulation loop between the output terminal of the second resistor and the input terminal of the second resistor.

4. The device according to claim 3, wherein the first adder/subtractor has a first intrinsic offset voltage, the second adder/subtractor has a second intrinsic offset voltage, and said offset voltage is greater than a sum of the first and second intrinsic offset voltages.

5. The device according to claim 1, wherein the measurement circuit stage comprises:
   a first differential amplifier circuit module having inputs coupled to the input terminal and the output terminal of the first resistor; and
   a second differential amplifier module having inputs coupled to the input terminal and the output terminal of the second resistor.

6. The device according to claim 5, wherein the measurement circuit stage further comprises:
   a first analog-to-digital conversion module coupled to outputs of the first differential amplifier circuit module;
   a second analog-to-digital conversion module coupled to outputs of the second differential amplifier module; and
   a processing circuit unit coupled to outputs of the first and second analog-to-digital conversion modules and configured to determine a present value of the current consumed by the load.

7. The device according to claim 5:
   wherein the first differential amplifier circuit module includes a first operational amplifier coupled to the input terminal of the first resistor and a second operational amplifier coupled to the output terminal of the first resistor, wherein a gain of the first operational amplifier is greater than a gain of the second operational amplifier; and
   wherein the second differential amplifier module includes a third operational amplifier coupled to the input terminal of the second resistor and a fourth operational amplifier coupled to the output terminal of the second resistor, wherein a gain of the third operational amplifier is greater than a gain of the fourth operational amplifier.

8. The device according to claim 7, further comprising:
   a first analog-to-digital converter coupled to an output of the first operational amplifier;
   a second analog-to-digital converter coupled to an output of the second operational amplifier;
   a third analog-to-digital converter coupled to an output of the third operational amplifier; and
   a fourth analog-to-digital converter coupled to an output of the fourth operational amplifier; and
   wherein the processing circuit unit is configured to process outputs of the first, second third and fourth analog-to-digital converters and select one output which provides a most significant value representative of a present value of the current consumed by said load.

9. The device according to claim 1, wherein the first power amplifier and the second power amplifier each have a frequency bandwidth greater by one frequency decade within a tolerance than a frequency bandwidth of the measurement circuit stage.

10. The device according to claim 1, produced in integrated form.

11. A method for power supplying and measuring the current consumption of a load, comprising:
   connecting in series a first power amplifier and a first resistor and a second resistor between a device input and said load, wherein the first resistor has a resistive value greater than a resistance value of the second resistor;
   applying a reference voltage to the device input; and when the first power amplifier saturates, supplying power to the load with an auxiliary voltage lower than the reference voltage through a second power amplifier and the second resistor, and measuring current consumed by the load at the terminals of the second resistor; and as long as the first power amplifier does not saturate, not activating the second power amplifier and supplying power to the load with the reference voltage through the first power amplifier and said first and second resistors, and measuring current consumed by the load at the terminals of the first resistor.

12. The method according to claim 11, wherein the auxiliary voltage is equal to the reference voltage minus an offset voltage.

13. The method according to claim 12, further comprising:

as long as the first power amplifier does not saturate, regulating at the reference voltage of a voltage present at terminals of the load using a first regulation loop incorporating the first power amplifier and said first and second resistors and having the reference voltage as a setpoint voltage; and when the first amplifier saturates, regulating at the auxiliary voltage of the voltage present at the terminals of the load using a second regulation loop incorporating the second power amplifier and the second resistor and having the auxiliary voltage as the setpoint voltage.

14. A device for power supplying and measuring the current consumption of a load, comprising:

a device input configured to receive a reference voltage;

a device output configured to be connected to said load;

a power supply circuit stage stage coupled between the device input and the device output, said power supply circuit stage comprising:

a series connection of a first power amplifier and a first resistor and a second resistor between a device input and said device output, wherein the first resistor has a resistive value greater than a resistance value of the second resistor;

a series connection of an offset voltage circuit configured to apply an auxiliary voltage lower than the reference voltage, a second power amplifier and said second resistor between the device input and said device output;

control circuitry configured:

as long as the first power amplifier is not saturated to supply power to the load with the reference voltage through the first power amplifier and said first and second resistors; and in response to the first power amplifier saturating, supplying power to the load with using the auxiliary voltage through the offset voltage circuit, the second power amplifier and the second resistor.

15. The device of claim 14, wherein the offset voltage circuit comprises a subtraction circuit configured to subtract an offset voltage from the reference voltage to generate the auxiliary voltage.

16. The device of claim 14, further comprising:

a first regulation loop incorporating the first power amplifier and said first and second resistors and having the reference voltage as a setpoint voltage configured for regulating the voltage at the device output when the first power amplifier is not saturated; and a second regulation loop incorporating the second power amplifier and the second resistor and having the auxiliary voltage as the setpoint voltage for regulating the voltage at the device output when the first power amplifier is saturated.

17. The device of claim 14, further comprising a measurement circuit stage configured to measure load current comprising:

a first differential amplifier circuit module having inputs coupled to the input terminal and the output terminal of the first resistor; and a second differential amplifier module having inputs coupled to the input terminal and the output terminal of the second resistor.

* * * * *